(12) United States Patent
Morimoto et al.

(10) Patent No.: US 8,572,047 B2
(45) Date of Patent: Oct. 29, 2013

(54) METHOD AND SYSTEM FOR DATA UPDATE SYNCHRONIZATION BY TWO-PHASE COMMIT

(75) Inventors: Kenji Morimoto, Bunkyo (JP); Kuniaki Shimada, Kawasaki (JP); Masazumi Matsubara, Kawasaki (JP); Yasuhide Matsumoto, Kawasaki (JP); Yuji Wada, Kawasaki (JP); Yukihiro Watanabe, Kawasaki (JP); Akira Katsuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/044,797

(22) Filed: Mar. 10, 2011

(65) Prior Publication Data

US 2011/0161288 A1 Jun. 30, 2011

Related U.S. Application Data

(63) Continuation of application No. PCT/JP2008/002561, filed on Sep. 17, 2008.

(51) Int. Cl.
*G06F 7/00* (2006.01)
*G06F 17/00* (2006.01)
*G06F 17/30* (2006.01)

(52) U.S. Cl.
CPC .... *G06F 17/30377* (2013.01); *G06F 17/30227* (2013.01)
USPC ............. 707/683; 707/684; 707/812; 714/19

(58) Field of Classification Search
CPC ................. G06F 17/30227; G06F 17/30377
USPC .............................. 707/683, 684, 812; 714/19
See application file for complete search history.

(56) References Cited

U.S. PATENT DOCUMENTS

| | | | | |
|---|---|---|---|---|
| 5,193,162 A | * | 3/1993 | Bordsen et al. | 711/152 |
| 5,363,505 A | * | 11/1994 | Maslak et al. | 718/100 |
| 5,668,958 A | * | 9/1997 | Bendert et al. | 710/305 |
| 5,796,999 A | | 8/1998 | Azagury et al. | |
| 6,397,247 B1 | * | 5/2002 | Shirakawa et al. | 709/223 |
| 7,444,333 B2 | * | 10/2008 | Jacobs et al. | 1/1 |

(Continued)

FOREIGN PATENT DOCUMENTS

| | | |
|---|---|---|
| JP | 04-060850 | 2/1992 |
| JP | 06-119227 | 4/1994 |

(Continued)

OTHER PUBLICATIONS

International Search Report issued in International App. No. PCT/JP2008/002561, mailed Nov. 4, 2008.

(Continued)

*Primary Examiner* — Phong Nguyen
(74) *Attorney, Agent, or Firm* — Greer, Burns & Crain, Ltd.

(57) ABSTRACT

In an integrated management database system having a plurality of element databases holding the configuration information about an information system and an integrated database for integrally managing the element databases, an element database which cannot return a reply while maintaining a secure state in response to an update request is not informed of the update request in the first phase of a two-phase commit, thereby attaining synchronization when data is updated, and maintaining the consistency of the data in the system.

17 Claims, 15 Drawing Sheets

(56) References Cited

U.S. PATENT DOCUMENTS

| | | | |
|---|---|---|---|
| 7,734,616 B2 | 6/2010 | Mogi et al. | |
| 2003/0046230 A1* | 3/2003 | Jacobs et al. | 705/42 |
| 2003/0046286 A1* | 3/2003 | Jacobs et al. | 707/8 |
| 2004/0163020 A1* | 8/2004 | Sidman | 714/100 |
| 2005/0144299 A1* | 6/2005 | Blevins et al. | 709/230 |
| 2005/0204206 A1* | 9/2005 | Arai et al. | 714/54 |
| 2005/0204207 A1* | 9/2005 | Arai et al. | 714/54 |
| 2005/0262390 A1* | 11/2005 | Okamoto et al. | 714/6 |
| 2005/0267878 A1 | 12/2005 | Mogi et al. | |
| 2006/0149786 A1* | 7/2006 | Nishiyama | 707/200 |
| 2007/0162449 A1* | 7/2007 | Manolov et al. | 707/8 |
| 2011/0029674 A1* | 2/2011 | Sidman | 709/226 |

FOREIGN PATENT DOCUMENTS

| | | |
|---|---|---|
| JP | 07-295871 | 11/1995 |
| JP | 08-286964 | 11/1996 |
| JP | 11-085595 | 3/1999 |
| JP | 11-219309 | 8/1999 |
| JP | 2003-150419 | 5/2003 |
| JP | 2006-221399 | 8/2006 |
| WO | WO 2006/085578 A1 | 8/2006 |

OTHER PUBLICATIONS

Notice of Rejection Ground issued in Japanese Patent Application No. 2010-529512, mailed Sep. 4, 2012 (with English translation).

Extended European Search Report issued in European Patent Application No. EP 08808502, mailed Sep. 11, 2012.

Bernstein, P.A., et al., "Concurrency Control and Recovery in Database Systems", 1987, Addison-Wesley Publishing Company, Chapter 8/Replicated Data, pp. 265-311.

Das Chagas Mendonca, et al., "Using Extended Hierarchical Quorum Consensus to Control Replicated Data: from Traditional Voting to Logical Structures", Proceedings of the Twenty-Seventh Annual Hawaii International Conference on System Sciences, 1994, vol. 1, IEEE Comput. Soc. Press, Los Alamitos, CA, pp. 303-312.

Samaras, George., et al., "Two-Phase Commit Optimizations in a Commercial Distributed Environment", Distributed and Parallel Databases, vol. 3, No. 4, Oct. 1, 1995, pp. 325-360.

Schiper, Nicolas, et al., "Optimistic Algorithms for Partial Database Replication", Jan. 1, 2006, Principles of Distributed Systems Lecture Notes in Computer Science (LNCS), pp. 81-93.

* cited by examiner

```
<Server name="A" model="Bravo" id="Server_Bravo_A">
    <CPU name="1" model="Charlie" socket="1"
        id="CPU_Bravo_A_Charlie_1" frequency="5.0 GHz"/>
    <CPU name="2" model="Charlie" socket="2"
        id="CPU_Bravo_A_Charlie_2" frequency="5.0 GHz"/>
    <CPU name="3" model="Charlie" socket="3"
        id="CPU_Bravo_A_Charlie_3" frequency="3.0 GHz"/>
</Server>
```

FIG. 6

CONFIGURATION INFORMATION 300

| | 301 | 302 | 303 |
|---|---|---|---|
| | DATA CLASS | DATA ID | ATTRIBUTE INFORMATION |
| 310 | Server | Server_Bravo_A | name="A", model="Bravo" |
| 320 | CPU | CPU_Bravo_A_Charlie_1 | name="1", model="Charlie", socket="1", frequency="5.0 GHz" |
| 330 | CPU | CPU_Bravo_A_Charlie_2 | name="2", model="Charlie", socket="2", frequency="5.0 GHz" |
| 340 | CPU | CPU_Bravo_A_Charlie_3 | name="3", model="Charlie", socket="3", frequency="3.0 GHz" |

CONFIGURATION INFORMATION REGISTRATION SOURCE META-INFORMATION

400

| DATA ID | CONFIGURATION INFORMATION REGISTRATION SOURCE |
|---|---|
| Server_Bravo_A | MDR 1 |
| CPU_Bravo_A_Charlie_1 | MDR 1 |
| CPU_Bravo_A_Charlie_2 | MDR 1 |
| CPU_Bravo_A_Charlie_3 | MDR 1 |

410 — DATA ID column
420 — Server_Bravo_A row
430 — CPU_Bravo_A_Charlie_1 row
440 — CPU_Bravo_A_Charlie_2 row
401 — header row
402 — CONFIGURATION INFORMATION REGISTRATION SOURCE column

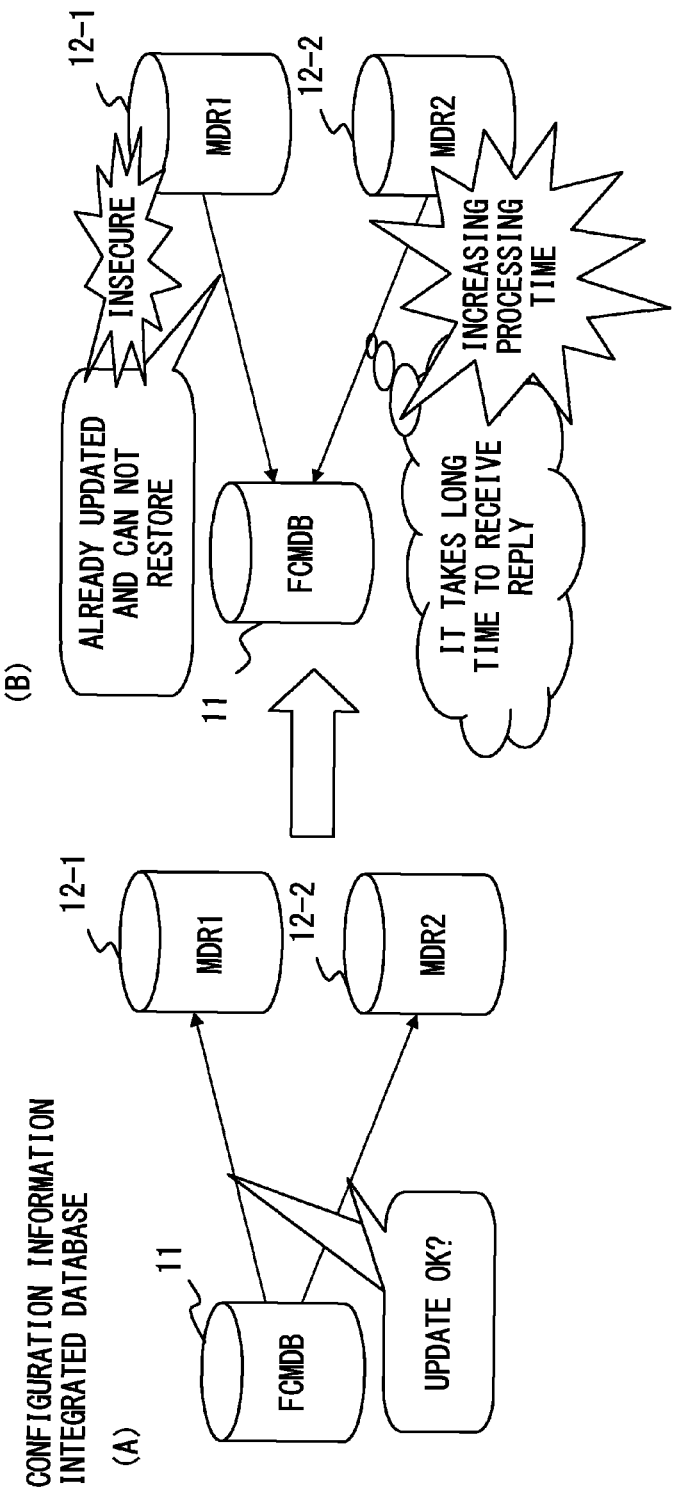
F I G. 15

METHOD AND SYSTEM FOR DATA UPDATE SYNCHRONIZATION BY TWO-PHASE COMMIT

CROSS-REFERENCE TO RELATED APPLICATIONS

This application is a continuation of an international application PCT/JP2008/002561, which was filed on Sep. 17, 2008, the entire contents of which are incorporated herein by reference.

FIELD

The present invention relates to a distributed database, and more specifically to a configuration information integrated database system for virtually and integrally managing a plurality of element databases which hold configuration information about an information system.

BACKGROUND

Generally, when data is updated in a distributed database, it is necessary to perform the synchronization between a master site database and a slave site database and maintain the consistency of data between the sites. In the distributed database, the synchronization in the data update is performed in a scheme called a two-phase commit.

In the two-phase commit, the commit control is performed separately in the first phase and the second phase.

In the first phase, the master site database transmits an update request to the slave site database. In the second phase, the master site database receives a response about the updatability from the slave site database, determines commit or abort based on the response, and notifies the slave site of the determination result. In the slave site, commit or rollback is executed based on the determination result received from the master site. In the two-phase commit, it is required that the slave site database maintains the "secure state" in which both commit and rollback can be performed while data can be updated from when an update request is received to when the determination result is reported.

FIG. 12 is a schematic diagram illustrating the method in a first phase of the two-phase commit in a general distributed database. In FIG. 12, the master site database is an integrated database 1001, and the slave site database is an element database 1002 (1002-1, 1002-2).

As illustrated in FIG. 12, in the first phase, the integrated database 1001 first notifies the element databases 1002-1 and 1002-2 of an update request, and inquires whether commit can be performed (FIG. 12(A)). The element database 1002-1 prepares for an update, and returns a response of "request for commit" to the integrated database 1001 while maintaining the secure state, if the update can be performed. The element database 1002-2 returns a response of "request for rollback" to the integrated database 1001 if the update cannot be performed.

In the second phase, the integrated database 1001 determines commit or rollback depending on the response from the element database 1002. In the determination, rollback is selected if there is any rollback response returned. The integrated database 1001 notifies the element database 1002 of the determination result. The element database performs commit or rollback process according to the notification from the integrated database 1001. In the case of the example in FIG. 12, the integrated database 1001 determines the rollback, and notifies the element databases 1002-1 and 1002-2 of the rollback. Upon receipt of the notification, the element databases 1002-1 and 1002-2 perform the rollback process.

Thus, in a general distributed database, the consistency of data held in each site is to be maintained by performing the synchronization between the master site database and the slave site database by the two-phase commit when data is updated.

However, in an FCMDB (Federated Configuration Management Database) system in which the configuration information about an IT system (information technology) is virtually and integrally managed, the two-phase commit cannot be applied.

The FCMDB system is described below. The FCMDB system is a database system in accordance with an ITIL (Information Technology Infrastructure Library). FIG. 13 illustrates the entire configuration of the FCMDB system.

An FCMDB system 10 is a distributed database system having a plurality of MDRs (Management Data Repositories) 12 (MDR1, MDR2, . . . , and MDRn) and an FCMDB 11 which virtually integrates the MDRs 12. Each of the MDRs 12 is a CMDB (Configuration Management Database) which manages a large amount of CIs (Configuration Items) and associates the CIs with each other. The FCMDB 11 itself is also a CMDB. In the CMDB, the CI is implemented as the configuration information (attribute information) about the resource configuring the IT system. The CMDB manages the CIs as associated with each other, and the association is referred to as a relationship.

FIG. 14 is an example of the distribution of the configuration information about the same resources in the FCMDB system.

In the FCMDB system, the configuration information of the same resources may be doubly registered in a plurality of MDRs. In the FCMDB system 10 illustrated in FIG. 14, the configuration information about the server A is registered in an MDR 12-1 (MDR1) and an MDR 12-2 (MDR2). The MDR 12-1 manages the information about a CPU (central processing unit) 31, memory 32, and a power supply (@power) 33 as the configuration information about a server 30 (A). The MDR 12-2 manages the information about the CPU 31, an HDD (hard disk device) 34, and the power supply 33 as the configuration information about the server A. Therefore, in this example, the CPU 31 and the power supply 33 in the components of the server A are doubly registered in the MDRs 12-1 and 12-2. In this example, the server 30, the CPU 31, the memory 32, and the HDD 34 are respective CIs.

Upon receiving the information register request from the MDR 12, the FCMDB 11 manages the configuration information about the resources. The FCMDB 11 manages not only the contents (for example, "value") but may also manage only the position information (pointer). The FCMDB 11 (1) determines whether or not there is an item that is doubly managed, (2) determines whether or not the information managed by a specific MDR 12 is to be held as the "primary information" about the item if there is a doubly managed item, and (3) holds the meta-information about which MDR 12 is a primary MDR (that manages the primary information) and which MDR 12 is a secondary MDR (that manages the secondary information), for each item of the resources managed by the MDRs 12-1 and 12-2.

What reads the information from the FCMDB system 10 and uses the information is called a "client". There is a data provider behind the MDR 12 to input data to the MDR 12. It is a typical operation management middleware. Operation management middleware reads data managed on a report, and detects and monitors an actual management target machine over a network.

As illustrated in the schematic diagram in FIG. 14, there are a plurality of MDRs which hold the configuration information about the same resources in the FCMDB system. Therefore, when there is an update request from an MDR to an FCMDB for the configuration information about a resource, it is necessary to also update the configuration information in other MDR which holds the configuration information about the resource. When the update is synchronously performed, the two-phase commit cannot be used in the FCMDB system because not all MDRs consider the participation in the distributed database in the FCMDB system. Therefore, the following problems (1) and (2) occur.

(1) There is an MDR which cannot return a response to the update request from the FCMDB while maintaining the secure state. This problem is caused by the fact that the FCMDB system is not an organized environment such as a distributed database etc., but a group of existing data storage (which may not be databases). Therefore, in the FCMDB system, there is an MDR in the FCMDB system which cannot securely check the updatability (if a response is prioritized, data is updated in a state where rollback is disabled, and on the other hand, the data update process cannot be started and no response can be returned if the secure state is prioritized).

(2) At the update request from the FCMDB, a response of the MDR may be severely delayed. This problem is caused by the fact that there may be a determination of a human in the response of the MDR. In the case of the two-phase commit, a reply to an update request is awaited for a specified time or longer, and when the time passes, it is determined that the participant who has transmitted the update request is in an abnormal state. However, it is not preferable to wait for the reply as described above because it reduces the performance of the entire system.

FIG. 15 is a schematic diagram illustrating the factor of inapplicability of the two-phase commit to the information update (data update) of MDR in the FCMDB system.

In the first phase of the two-phase commit, the FCMDB 11 inquires of the MDRs 12-1 and 12-2 whether or not the update can be performed (FIG. 15(A)). In this example, as illustrated in FIG. 15(B), when the update request is received from the FCMDB 11, the MDR 12-1 is in an insecure state (corresponding to the reason (1) above). Therefore, the MDR 12-1 returns to the FCMDB 11 a response that represents "the update has been performed, and the information cannot be restored". The MDR 12-2 requires an operation of a user in updating information, and it takes a long time to return a response to the FCMDB 11 (corresponding to the reason (2) above).

As described above, the two-phase commit cannot be used in the synchronization of the data (information) update in the FCMDB system.

In the general distributed database, an invention of a method of shortening the processing time for data update by the two-phase commit is known (Patent Document 1). Patent Document 1: Japanese Laid-open Patent Publication No. 6-119227

SUMMARY

The present invention is based on a integrated management database system having a plurality of element databases for holding configuration information about an information system to be managed and an integrated database for integrally managing the plurality of element databases.

The integrated database of the integrated management database system according to the present invention includes: a configuration information database to collectively manage the configuration information held in the plurality of element databases; processing policy registration means for registering in advance a processing policy for each of the configuration information registered in the configuration information database; update request means for referring to the processing policy relating to update data registered in the processing policy registration means when data stored in the configuration information database is updated, and transmitting an update request only to a higher priority element database holding the update data; updatability decision means for receiving a response from the element database to which the update request means transmitted the update request, and determining whether or not an update is committed based on the received response; and update process communication means for instructing all element databases holding the update data to perform commit or rollback depending on the determination result of the updatability decision means.

According to the integrated management database system, a processing policy is registered in advance for each data of configuration information, and when the data is updated, the processing policy registered for the data is referred to, and an update request is reported only to a higher priority element database. Therefore, by appropriately setting the processing policy, a notification of an update request can be prevented from being transmitted to an element database which cannot maintain a secure state. Accordingly, the data of the integrated management database system can be synchronously updated by applying the two-phase commit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an example of a representation of configuration information;

FIG. 7 illustrates the data structure of the configuration information represented by the XML format in FIG. 6;

FIG. 8 illustrates the data structure of the meta-information about the configuration information (registration source meta-information for configuration information) in FIG. 7;

FIG. 15 is a schematic diagram of the factor for which the two-phase commit cannot be applied in updating the information about the MDR in the FCMDB system.

DESCRIPTION OF EMBODIMENTS

Figure 1:
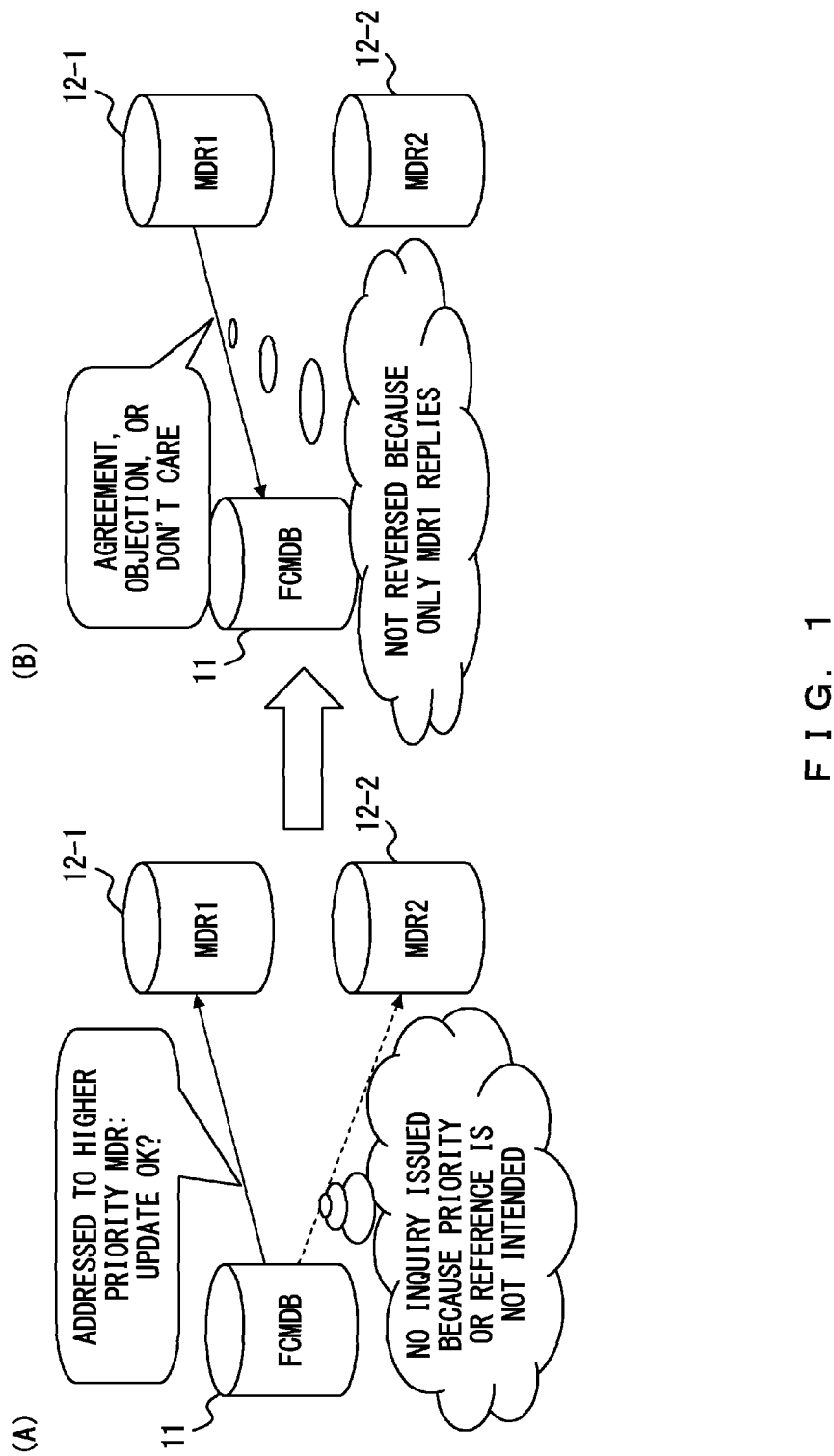
FIG. 1 is an explanatory view of the operation when an update request is issued to a higher priority MDR and other MDR in the first phase of the two-phase commit.

The embodiment of the present invention is described below with reference to the attached drawings. First, the principle of the present embodiment is described.

Principle of the Embodiment

In the present embodiment, the two-phase commit is adopted with the data storage scheme specific to the FCMDB system described in (1) and (2) below taken into account when data is synchronously updated.

(1) In the FCMDB system, it may not be necessary that pieces of data stored in a plurality of MDRs strictly match each other.

(2) There is a case in which data can be held in the FCMDB and, at the worst, it is only necessary that the data is correct.

In the FCMDB system of the present embodiment, the FCMDB and the MDR manage the information (configuration information) about the resources configuring the IT system for respective CI. The CI includes a record, and the record includes a property. That is, the property is a part of the record, and the record is a part of the CI. Therefore, the data stored in the FCMDB and the MDR is expressed by the property (attribute), the record, and the CI in the ascending order of the particle size.

Processing policy in inquiry and sum-up in two-phase commit

In the present embodiment, a processing policy is set for each of CI, record, and property. In an inquiry and sum-up in the two-phase commit, a processing policy is referred to for each of CI, record, and property. In this case, a processing policy for smaller data unit is to be referenced faster.

he processing policy refers to a "policy determined in advance as to which MDR is to prioritized and which MDR is to be referenced". The processing policy may be described definitely as "the MDR1 to be prioritized", described somewhat in the abstract by specifying the role as "the master MDR to be prioritized", and described by a combination of mathematical expressions. In the following explanation, the term "processing policy" may be represented by another term "priority information". These terms have substantially the same meanings, and the processing policy mainly refers to "what is to be performed". In the present embodiment, the MDR is ranked "higher priority MDR", "reference MDR", and "other MDR" for each data unit, and the information about the ranking is priority information. That is, the priority information refers to the ranking order of MDRs. In the present embodiment, when "what is to be performed" is determined, the priority information is used.

For example, the processing policies are listed below.

(1) "Opinion priority/reference of master MDR", "opinion priority/reference of specific MDR", and "opinion priority/reference of FCMDB" In the description above, a master refers to a main information source in the FCMDB when a plurality of information sources are provided for one property. The master can be dynamically changed. In addition, an MDR having an opinion priority is defined as a "higher priority MDR", and an MDR managed to be opinion referenced is defined as a "reference MDR".

(2) The priority is represented numerically. For example, a mathematical expression for calculating the point of the master MDR, the point of the specific MDR, the point of the FCMDB, and the value of the priority is determined in advance, and the value of the priority is calculated on each MDR by the predetermined mathematical expression. Then, for example, the MDR having the highest priority, or the MDR having the priority of a predetermined value or higher is determined as an MDR to be opinion prioritized (higher priority MDR).

(3) Relating to the MDR (defined as other MDR) other than the higher priority MDR or the reference MDR, no inquiry is made in the first phase of the two-phase commit, and only a process determination result is notified in the second phase.

Optional response in first phase of two-phase commit

In the present embodiment, "Don't Care (any response may be selected)" is added to the responses of the concerned party (MDR) in the first phase. When the entire process can be performed regardless of the updatability of an MDR, the MDR returns "Don't Care", which is effective when it takes long time for updating process.

Processing Policy of Two-Phase Commit

As described above, the MDR which participates in the two-phase commit is classified into a "higher priority MDR", a "reference MDR", or a "other MDR", and the processing policy is determined for each MDR.

(1) Opinion Priority of Higher Priority MDR The FCMDB transmits an update request to the higher priority MDRs, and if at least one response represents the update can not be performed, the rollback is performed for entire system. If there is one higher priority MDR, it is not necessary that the higher priority MDR maintains the secure state because, when there is only one higher priority MDR, the FCMDB defines the response of the higher priority MDR as a processing policy as is.

(2) Opinion Reference of Reference MDR

When the FCMDB transmits an update request to the reference MDR, the response is regarded as a reference. However, when the response represents the update can not be performed, commit may be entirely performed. This scheme is significant when there is no higher priority MDR or the higher priority MDR returns "Don't Care". In these cases, the higher priority MDR returns no updatability notification.

(3) Other MDR (MDR other than Higher Priority MDR or Reference MDR)

The FCMDB does not transmit an update request to other MDRs, but reports only a process determination in the second phase. It is not necessary that other MDRs maintain the secure state. That is, since no update request is transmitted to the other MDRs in the first phase, other MDRs do not have to maintain the secure state.

Method of determining higher priority MDR when processing policy is described by mathematical expression In the present embodiment, as described above, the point of the master MDR, the point of the specific MDR, and the point of the FCMDB are determined in advance. For example, assume that the point of the master MDR is 50, the point of the MDR1 is 30, and the point of the FCMDB is 20 (in this case, the point of MDR except for the MDR1 is set to zero). The mathematical expression used for calculating the priority is also determined in advance. The mathematical expression is, for example, as follows.

$$\text{Priority} = \text{Master} \times 2 + \text{MDRany} + \text{FCMDB} \quad (1)$$

Master: expression indicating the point of the master MDR
MDRany: expression indicating the point of any MDR
FCMDB: expression indicating the point of the FCMDB When the priority of each MDRn is calculated using the equation (1) above, the MDRany in the equation (1) is substituted by the point of the MDRn. In the equation (1), the FCMDB indicates the MDR (configuration information database) provided in the FCMDB.

In addition to the descriptions above, an applicable mathematical expression is defined in broader/narrower data units, and a point is specified by Master=50, MDR1=30, and FCMDB=20. The point is defined in broader/narrower data units, and a mathematical expression is specified by the equation (1) above. In addition, a mathematical expression for calculating the priority may include a subtraction in addition to an addition and a multiplication.

A method of determining a higher priority MDR and a reference MDR is, for example, as follows.

Defining an MDR whose priority is a specified value n1 or more as a "higher priority MDR", and defining an MDR whose priority is a specified value n2 (n2<n1) or more as a "reference MDR"

Defining two MDRs having the two highest priorities as higher priority MDRs, defining the next three MDRs as reference MDRs (However, in making the determination, the MDRs having no data to be updated are excluded)

Data Units and Processing Policy

The data units stored in the FCMDB and the MDR are a property, a record, and a CI in the ascending order of the particle size. In this case, after adopting the "opinion priority of the MDRn" set in the smaller element (for example, a property unit), the processing policy of a broader data unit to be referenced may also be used. For example, when a processing policy similar to a record is applied to all properties of the record, the processing policy of each of the properties is set as "refer to the processing policy of a broader data unit".

There are various types of setting patterns for a processing policy in each data unit of the CI. For example, there are following setting patters.

(1) setting only for the property
(2) setting only for the record
(3) setting only for the CI
(4) setting for the property and the record
(5) setting for all of property, record, and CI Method of determining higher priority MDR, reference MDR, and other MDR The determination of a higher priority MDR, a reference MDR, or other MDR is statically or dynamically made according to the predetermined policy. For example, when it is necessary for the data of an MDR to match the data of the FCMDB system, a policy that the MDR is to be a "higher priority MDR" is established. Furthermore, when it is not necessary that the data matches the data of the FCMDB system, the MDR is set as a "reference MDR" or an "other MDR". Practically, based on the property of the FCMDB, there are a larger number of MDRs as reference MDRs or other MDRs.

Saving Insecure MDR

When there are a plurality of higher priority MDRs, and some of them are in the insecure state in the first phase of the two-phase commit, there is the possibility that the synchronous update of data is disturbed. When the disturbance may occur, the following countermeasures can be taken.

An appropriate policy is devised to avoid the disturbance, and no specific process is performed.

A warning is issued when the disturbance may occur, and a user is prompted to solve the problem.

Use of higher priority MDR and reference MDR

In this embodiment, a "management user" is assumed as a CI, and a "destination mail address" is assumed as its property. In the FCMDB system, it is assumed that there are following MDRs for storing the CI.

(1) Personnel Information Management MDR

Since it is the information as a personnel master, it is set as a higher priority MDR.

(2) Operation Management MDR

Although it is the information as a contact destination when a fault occurs, it is assigned a lower priority than the personnel master, and is set as a reference MDR.

(3) Asset Management MDR

Since it is not used as a contact destination, it is set as other MDR.

Operation of Two-Phase Commit

<First Phase> a) When there is no higher priority MDR or reference MDR, it is assumed to be commit, and control is passed to the second phase.

b) When there is one or a plurality of higher priority MDR or reference MDR:

(1) the FCMDB issues an update request to the higher priority MDR and the reference MDR, and receives a response about the updatability from them.

(2) to analyze the response result and decide updatability (3) to decide whether commit or rollback and control is passed to the second phase.

<Second Phase> a) In the case of commit an update notification is transmitted to higher priority, reference, and other MDRs.

b) In the case of rollback rollback notification is transmitted to higher priority and reference MDRs.

Described below is an example of an operation of the first phase of the two-phase commit in the present embodiment. FIG. 1 is an explanatory view of the operation when an update request is issued to a higher priority MDR and other MDR in the first phase of the two-phase commit.

In FIG. 1, the MDR 12-1 is a "higher priority MDR", and the MDR 12-2 is an "other MDR". In this case, as illustrated in FIG. 1 (A), the FCMDB 11 inquires of the higher priority MDR 12-1 about the updatability, but does not issue inquiry to the other MDR 12-2. As illustrated in FIG. 1 (B), upon receipt of an inquiry about the update request from the FCMDB 11, the MDR 12-1 returns a response of "agreement (commit)", "objection (rollback)", or "Don't Care" to the FCMDB 11.

Figure 2:
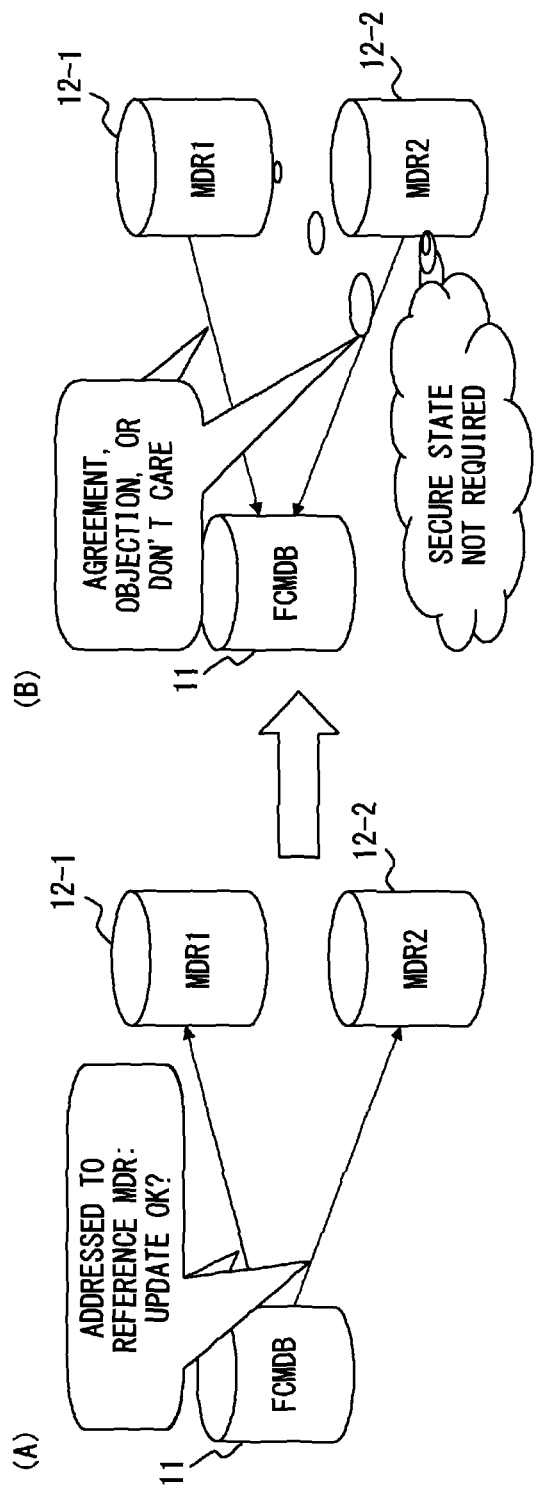
FIG. 2 is an explanatory view of the operation when an update request is issued only to a reference MDR in the first phase of the two-phase commit.

FIG. 2 is an explanatory view of the operation when an update request is issued only to a reference MDR in the first phase of the two-phase commit.

In FIG. 2, the MDRs 12-1 and 12-2 are "reference MDRs". In this case, as illustrated in FIG. 2(A), the FCMDB 11 inquires of the reference MDRs 12-1 and 12-2 about the updatability. As illustrated in FIG. 2(B), the reference MDRs 12-1 and 12-2 returns a response of "agreement (commit)", "objection (rollback)", or "Don't Care" to the FCMDB 11. As described above, the reference MDR can update the data although it is instructed by the FCMDB 11 to perform "rollback" in response to the "updatability". Therefore, it is not necessary for the reference MDRs 12-1 and 12-2 to maintain the secure state.

Figure 3:
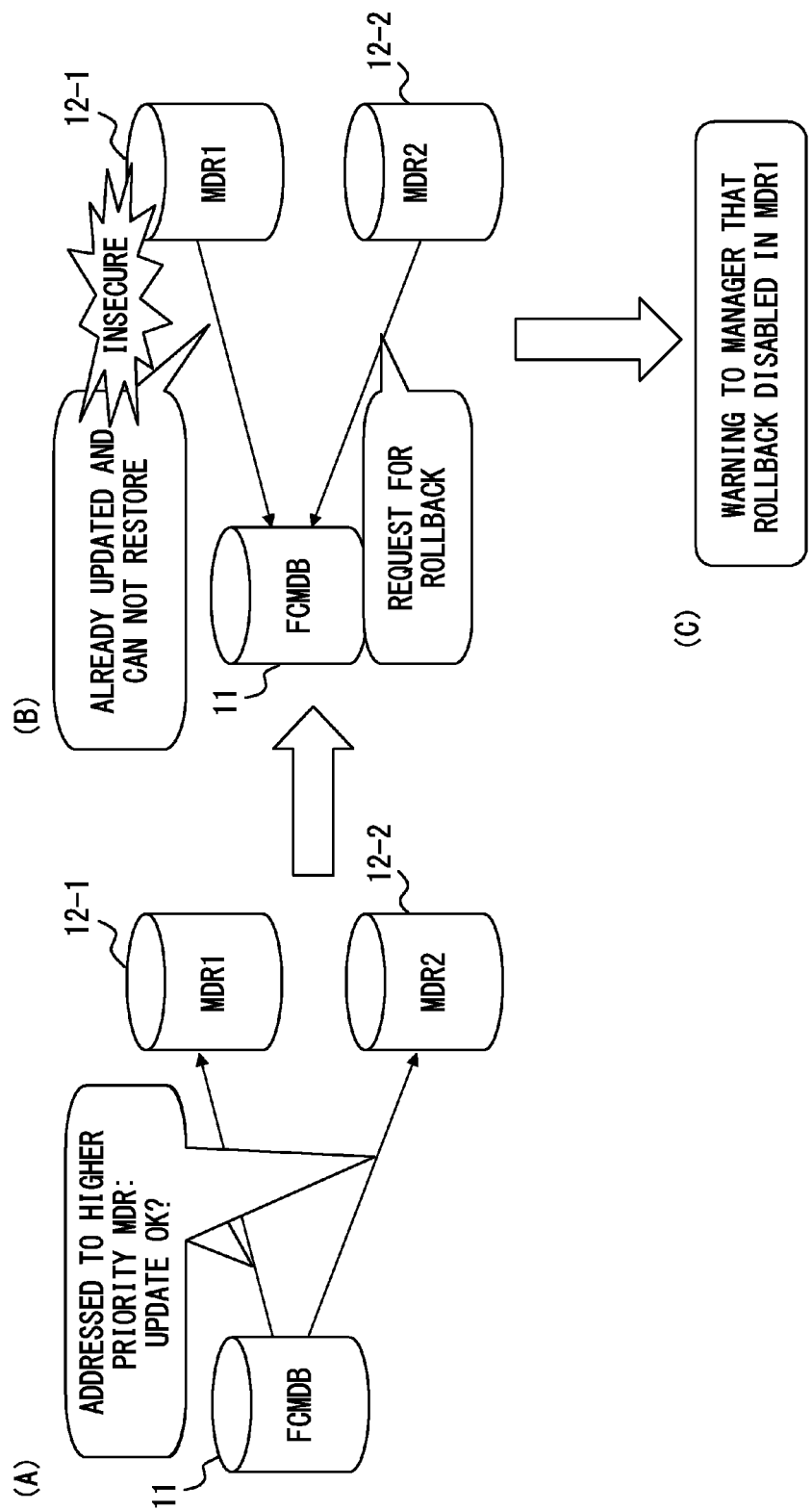
FIG. 3 is an explanatory view of an example of a faulty in the first phase of the two-phase commit when there are a plurality of higher priority MDRs.

FIG. 3 is an explanatory view of an example of a faulty in the first phase of the two-phase commit when there are a plurality of higher priority MDRs.

In FIG. 3, the MDRs 12-1 and 12-2 are higher priority MDRs. As illustrated in FIG. 3(A), the FCMDB 11 inquires of the higher priority MDRs 12-1 and 12-2 about the "updatability" as in the case illustrated in FIG. 1(A). In this case, as illustrated in FIG. 3(B), when the higher priority MDR 12-1 is in an insecure state, it transmits a response representing "the data has already been updated, and cannot be restored". On the other hand, the higher priority MDR 12-2 returns a response of "rollback requested" to the FCMDB 11. In this case, the FCMDB 11 transmits a warning that represents "rollback is disabled in the MDR 12-1 (MDR1)" to the manager, as illustrated in FIG. 3(C), to save the higher priority MDR1.

Configuration of the Embodiment
Entire Configuration of the System

Figure 4:
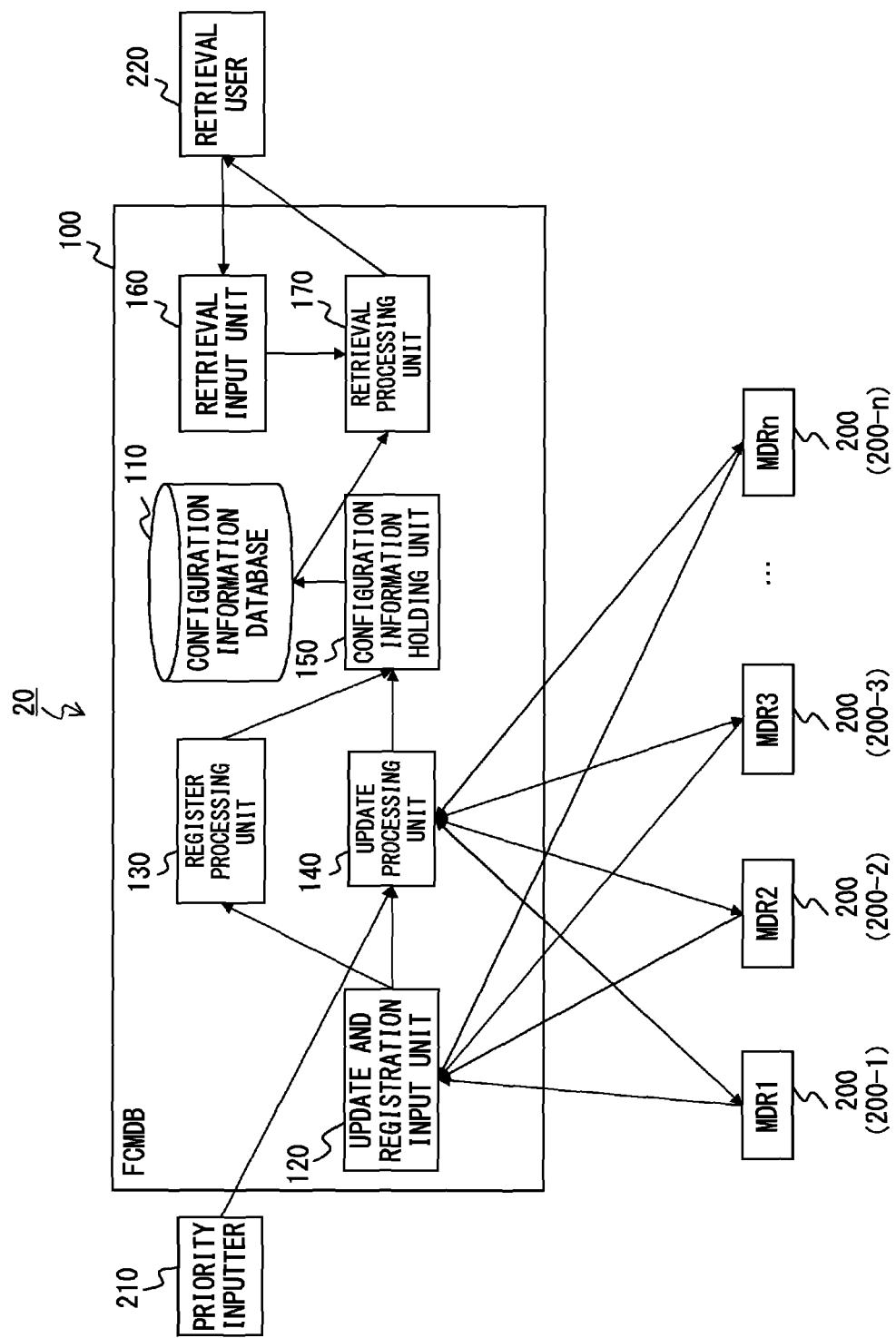
FIG. 4 is an entire configuration of the FCMDB system according to an embodiment.

FIG. 4 is an entire configuration of the FCMDB system according to an embodiment.

An FCMDB system 20 illustrated in FIG. 4 includes a FCMDB 100 and n MDRs 200 (MDR1, MDR2, MDR3, ..., MDRn).

The FCMDB 100 includes a configuration information DB (configuration information database) 110, an update and registration input unit 120, a register processing unit 130, an update processing unit 140, a configuration information holding unit 150, a retrieval input unit 160, and a retrieval processing unit 170.

Figure 13:
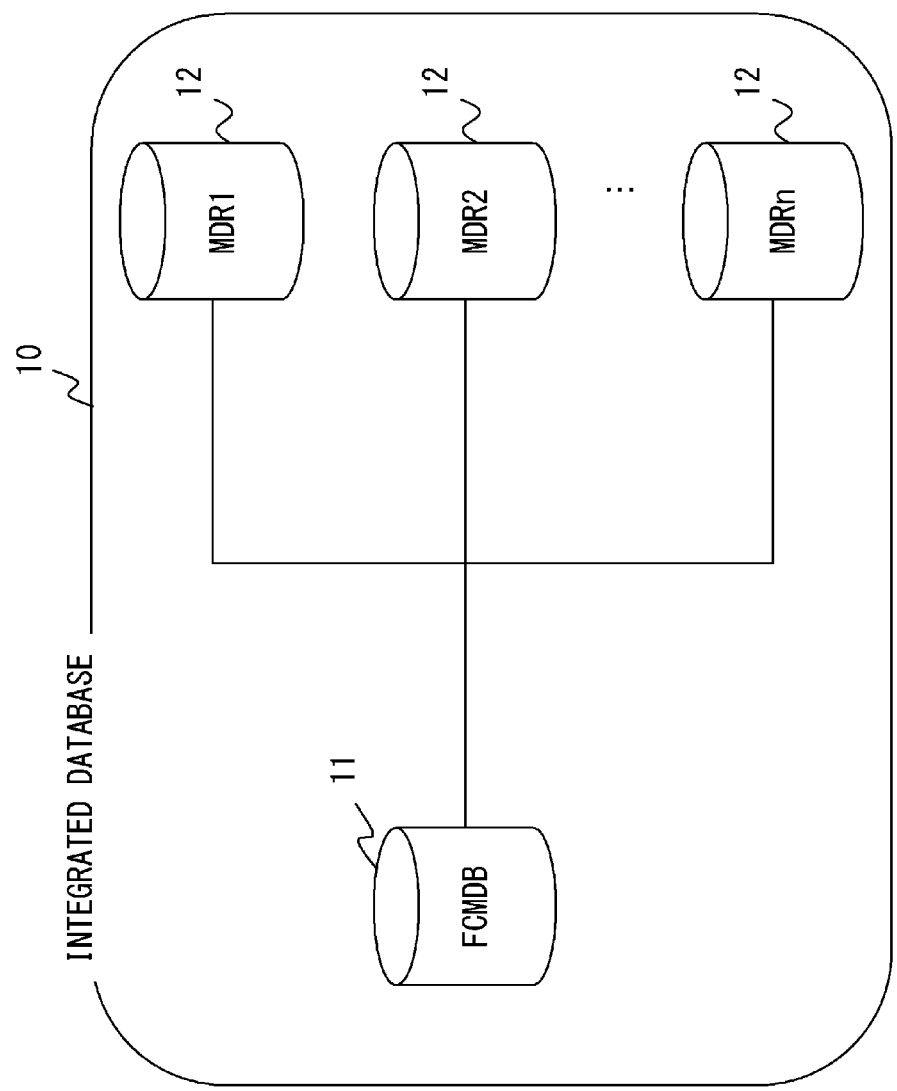
FIG. 13 is the entire configuration of the FCMDB system.
Figure 14:
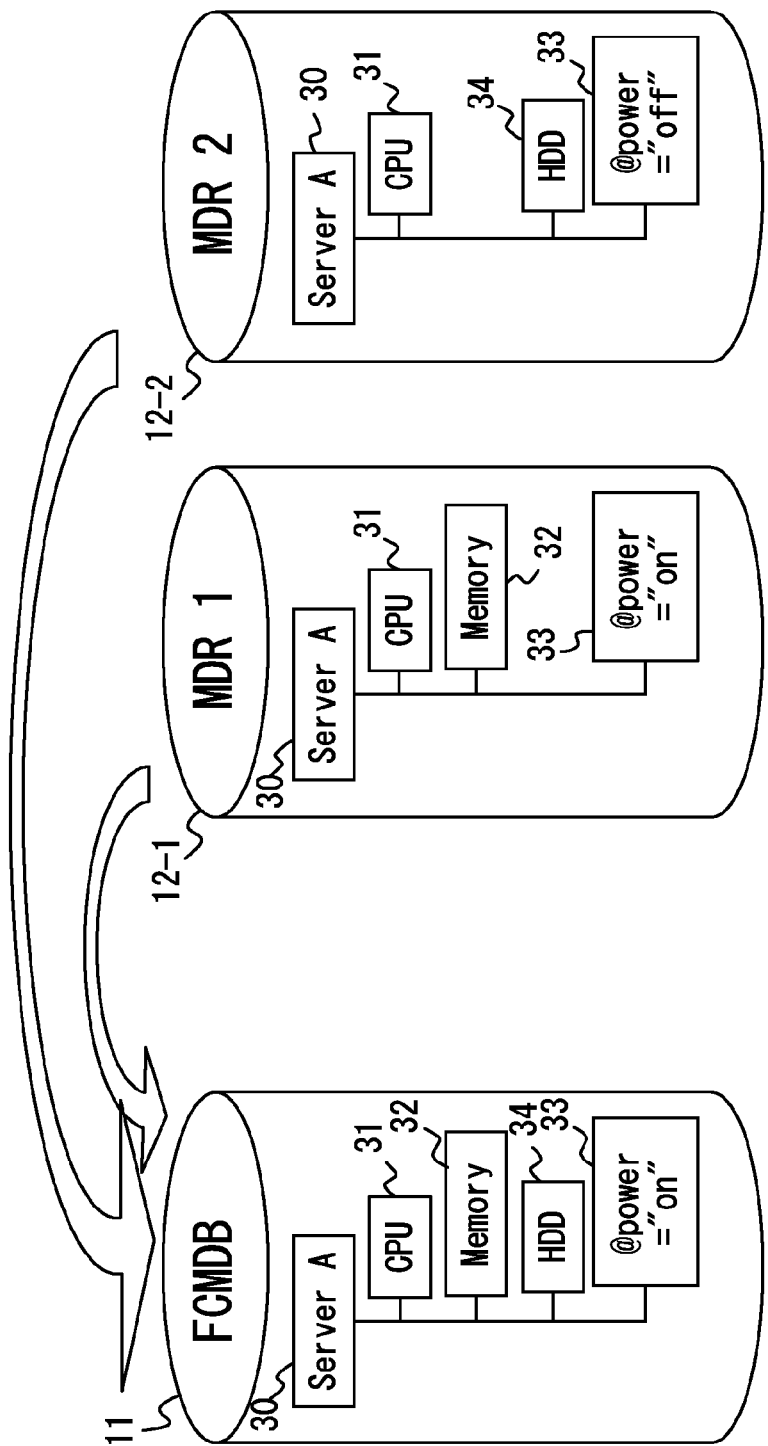
FIG. 14 is an example of distributing the configuration information about the same resources in the FCMDB system.

The configuration information database 110 integrally manages n MDRs 200. The configuration information database 110 integrally manages the configuration information about the CIs multi-stored in an MDR 200-1 (MDR1), an MDR 200-2 (MDR2), an MDR 200-3 (MDR3), ..., an MDR 200-n (MDRn) in the scheme illustrated in FIG. 13. The configuration information database 110 itself is an MDR provided in the FCMDB system 20. The configuration information database 110 can be a "higher priority MDR", a "reference MDR", or an "other MDR". When it is assumed that the FCMDB system 20 is a distributed database, the FCMDB 100 may be regarded as an integrated database, and the n MDRs and the configuration information database 110 in the FCMDB 100 may be regarded as an element database.

The update and registration input unit 120 accepts requests to update and register the configuration information (attribute information) about the CI from all MDRs 200, and appropriately allocates the requests to the respective processing units. The update and registration input unit 120 transmits the request to register the configuration information to the register processing unit 130, and transmits the request to update the configuration information to the update processing unit 140.

Upon receipt of the request to register the configuration information from the update and registration input unit 120, the register processing unit 130 transmits the registration information to the configuration information holding unit 150.

Upon receipt of the request to update the configuration information from the update and registration input unit 120, the update processing unit 140 synchronously updates the information (data) in the higher priority MDR and the reference MDR holding the configuration information using the above-mentioned two-phase commit protocol. In addition, the update processing unit 140 receives the priority information about the configuration information from the priority inputter 210 and holds the priority information inside.

The configuration information holding unit 150 manages the registration and update of the configuration information for the configuration information database 110. The configuration information holding unit 150 receives the configuration information to be registered in the configuration information database 110, and registers the configuration information in the configuration information database 110. It also receives the two-phase commit control from the update processing unit 140, and updates the configuration information registered in the configuration information database 110.

The retrieval input unit 160 accepts the request to retrieve the configuration information from a retrieval user 220. The retrieval input unit 160 requests the retrieval processing unit 170 to retrieve the configuration information specified in the retrieve request.

The retrieval processing unit 170 reads from the configuration information database 110 the configuration information requested from the retrieval input unit 160, and transmits the configuration information to the retrieval user 220.

Configuration of the updating unit 140 of the FCMDB 100

Figure 5:
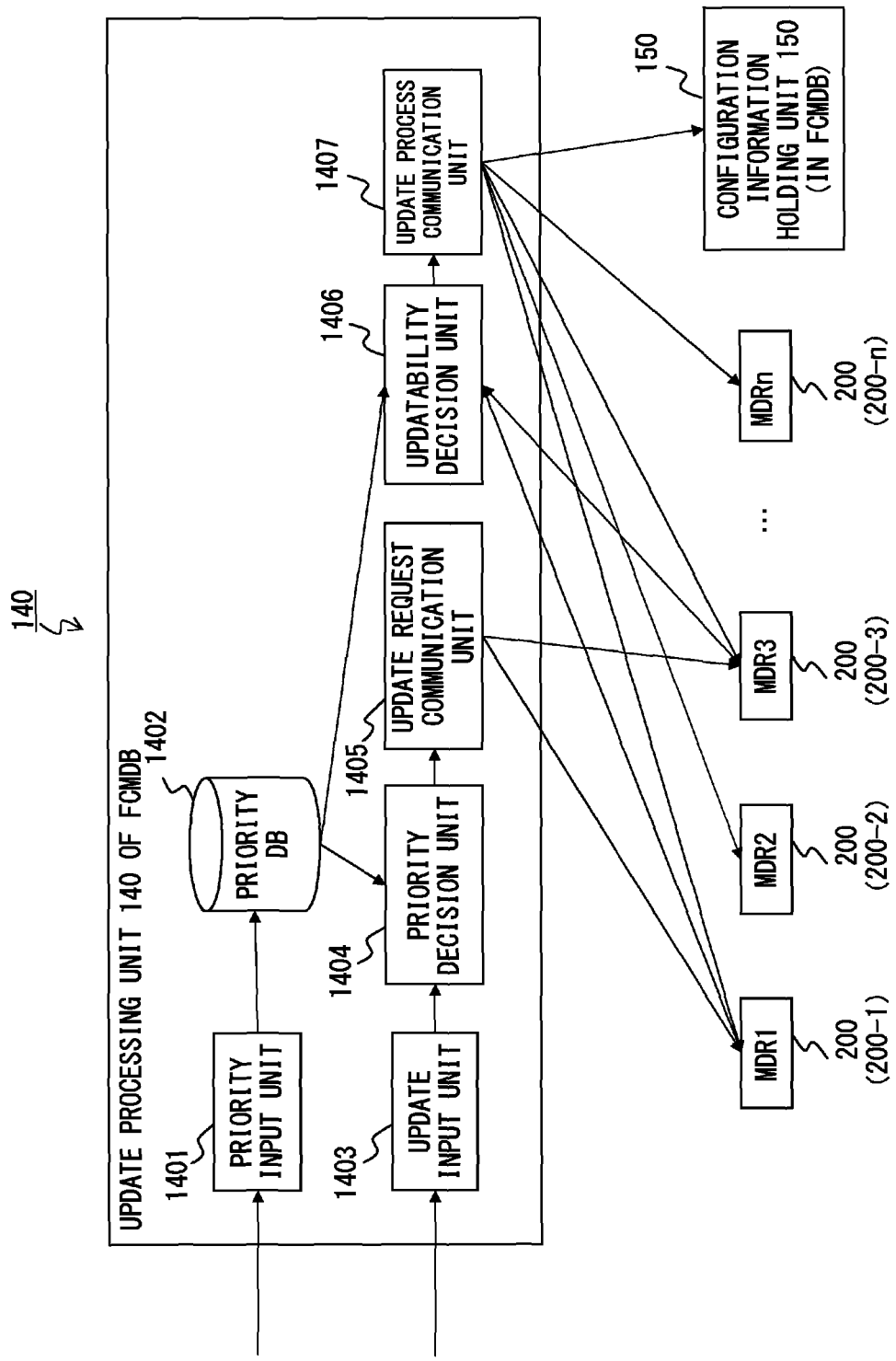
FIG. 5 is a configuration of the update processing unit of the FCMDB.

FIG. 5 is a configuration of the update processing unit 140 of the FCMDB 100. As illustrated in FIG. 5, the update processing unit 140 includes a priority input unit 1401, a priority database (priority DB) 1402, an update input unit 1403, a priority decision unit 1404, an update request communication unit 1405, an updatability decision unit 1406, and an update process communication unit 1407.

The priority input unit 1401 inputs the priority information input by a priority inputter 210 (FIG. 4), and registers the priority information in the priority DB 1402. The priority information is the "processing policy" relating to respective CI managed by the system. The processing policy can be set in a CI unit, a record unit, and a property unit.

The priority DB 1402 is managed by the priority input unit 1401, and stores the priority information (processing policy) for each CI managed by the system. The update input unit 1403 inputs the update request of the CI from each MDRi (i=1 through n), and notifies the priority decision unit 1404 of the CI for which the update request has been issued.

When the priority decision unit 1404 receives the CI from the update input unit 1403, it refers to the priority information (processing policy) about the CI registered in the priority DB 1402, and determines "higher priority MDR", the "reference MDR", or the "other MDR" for the MDRk (k=1 through n) holding the CI. Then, it notifies the update request communication unit 1405 of the decision result.

The update request communication unit 1405 performs the process of the first phase in the data update by the two-phase commit protocol for the CI for which the update request has been issued. The update request communication unit 1405 transmits an update request to the MDRm (m=1 through n) defined as the higher priority MDR and the reference MDR based on the information (the decision result) received from the priority decision unit 1404.

The updatability decision unit 1406 receives a response from the MDR to which the update request communication unit 1405 has transmitted an update request. The response is "commit", "rollback", or "Don't Care." The updatability decision unit 1406 determines to commit or rollback the data update based on the response received from the MDR, and notifies the update communication unit 1407 of the decision result.

Upon receipt of the notification of the decision as commit from the updatability decision unit 1406, the update process communication unit 1407 instructs the higher priority MDR, the reference MDR, the other MDR, and the configuration information holding unit 150 to perform the commit. Furthermore, upon receipt of a notification of the decision as rollback from the updatability decision unit 1406, the update process communication unit 1407 instructs the higher priority MDR, the reference MDR and the configuration information holding unit 150 to perform the rollback.

Representation of configuration information

FIG. 6 is an example of a representation of configuration information. FIG. 6 illustrates the configuration information of the server A represented in the XML (extensible markup language) format which can be implemented with three types of CPUs 1, 2, and 3. The CI of the server A includes a record having three types of properties (attributes), that is, name, model, id (identifier). The CI of each of the CPUs 1, 2, and 3 includes a record having five types of properties, that is, name, model, socket (CPU socket), id (identifier), and frequency (operation frequency).

Data structure of configuration information

FIG. 7 illustrates the data structure of the configuration information represented by the XML format in FIG. 6.

The configuration information described by the XML format illustrated in FIG. 6 is stored in the configuration information database 110 as a table having the data structure as illustrated in FIG. 7. Each row of a table 300 illustrated in FIG. 7 corresponds to each CI. Each row of the table 300 stores items of a data class 301, a data ID 302, and attribute information 303. CI 310 of the server A is stored in a first row of the table 300, and the CIs 320, 330, and 340 of the CPUs 1, 2, and 3 are stored in second through fourth rows. The data class 301 is an item indicating the classification of each CI. The CI 310 in the first row of the table 300 is classified into a "server". The CIs 320 through 340 stored respectively in the second through fourth rows of the table 300 are classified into "CPUs". The data ID 302 is an item indicating the identification ID of CI. The attribute information 303 stores all attribute information provided for each CI. A set of attribute information stored in the item area of the attribute information 303 corresponds to the record of the CI. The CIs 310 through 340 stored in the table 300 illustrated in FIG. 7 are examples of the CIs including only one record. The CI according to the present invention may be configured to include a plurality of records. In this case, the CI has the data structure of, for example, including plural pieces of attribute information 303.

Configuration information registration source meta-information

FIG. 8 illustrates the data structure of the meta-information about the configuration information (configuration information registration source meta-information) in FIG. 7.

The configuration information registration source meta-information indicates the registration source of the configuration information. The configuration information registration source meta-information is held in the configuration information database 110. The configuration information registration source meta-information 400 illustrated in FIG. 8 is formed by a table to store in each row a data ID 401 and a configuration information registration source 402. The data ID 401 in the configuration information registration source meta-information 400 is equivalent to the data ID 302 of the configuration information 300. That is, the configuration information registration source meta-information 400 and the configuration information 300 are linked by the data ID.

The configuration information registration source 402 indicates the master MDR which holds the configuration information of the CI having the data ID 401 in the same row. In the configuration information registration source meta-information 400 in FIG. 8, configuration information registration source meta-information 410 for the server A is stored in a first row, and configuration information registration source meta-information 420, 430, and 440 for the CPU 1 (name="1"), CPU 2 (name="2"), and CPU 3 (name="3") are stored respectively in second through fourth rows. The configuration information represents "configuration information about CI including the information that CI exists".

Priority Information

Figure 9:
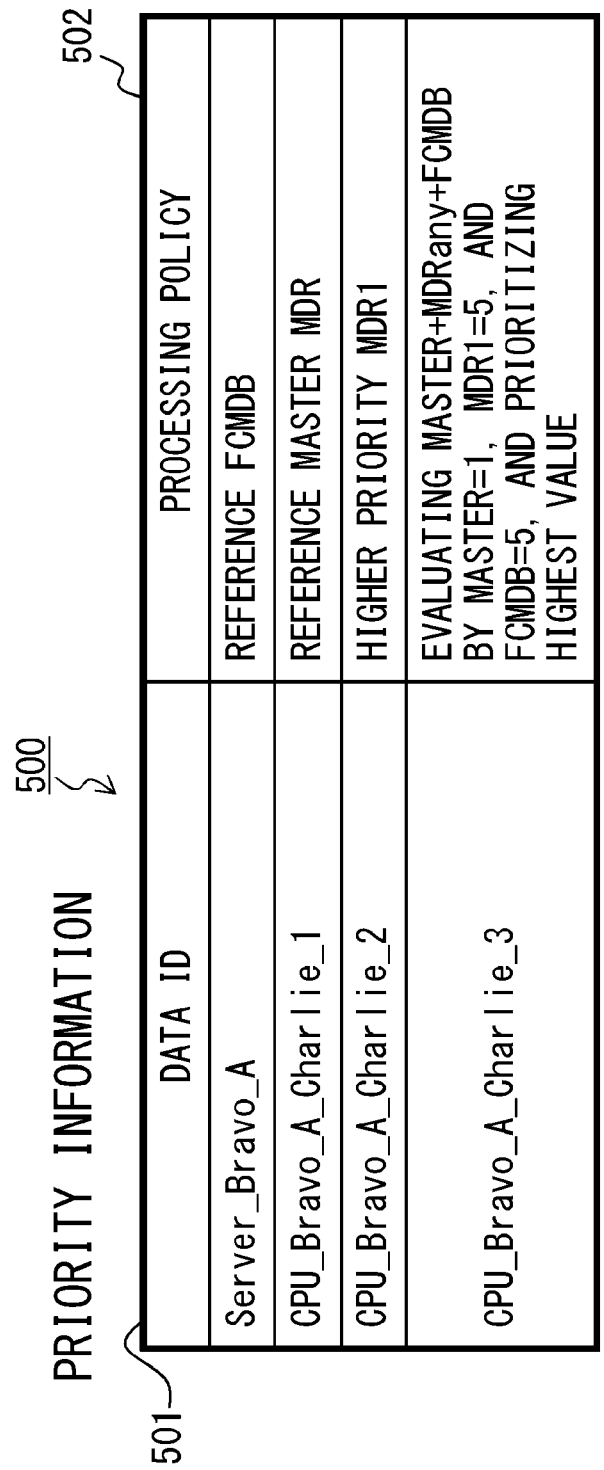
FIG. 9 illustrates the data structure of the priority information stored in the priority DB.

FIG. 9 illustrates the data structure of the priority information stored in the priority DB 1402.

The priority information is used in setting the processing policy in each data unit of the configuration information. Priority information 500 in FIG. 9 is an example of the priority information for setting the processing policy for the CI.

In the example in FIG. 9, the priority information 500 is represented by a table in which two items, that is data ID 501 and processing policy 502, are stored in each row. The data ID 501 is equivalent to the data ID 302 of the configuration information 300. That is, the configuration information 300 and the priority information 500 are linked by a data ID. The processing policy 502 is intended for the data of the CI having the data ID 501 in the same row. The priority information when the processing policy is set for a property stores the "data ID" or the "data ID+record name+property name" in the item of the data ID, and other structure is the same as that of the priority information 500. The priority information when the processing policy is set for a record stores the "data ID" or the "data ID+record name" in the item of the data ID, and otherwise the structure is the same as that of the priority information 500. That is, in the table in FIG. 9, the item contents of the data ID are changed only, thereby setting the processing policy of the CI, the record, or the property.

In the priority information 500 in FIG. 9, the processing policy for the CI classified into the server A is stored in a first row, and the processing policies for the CI classified into the CPUs 1, 2, and 3 are stored respectively in second, third, and fourth rows. In the example in FIG. 9, the processing policy 502 for the CI classified into the server A is "reference FCMDB". It indicates that the configuration information database 110 of the FCMDB 100 is a reference MDR in the data update of the CI classified into the server A. The processing policy 502 for the CI classified into the CPU 1 is "reference master MDR". It indicates that the master MDR is a reference MDR in the data update of the CI classified into the CPU 1. The processing policy 502 for the CI classified into the CPU 2 is "higher priority MDR1". It indicates that the MDR1 is a higher priority MDR in the data update of the CI classified into the CPU 2. The processing policy 502 for the CI classified into the CPU 3 is "Evaluating Master+MDRany+FCMDB by Master=1, MDR1=5, and FCMDB=5, and the highest value is prioritized". In the example in FIG. 9, only the processing policy for the CI classified into the CPU 3 is the "description of the condition for determining a higher priority MDR based on the mathematical expression of the priority of each MDR and the value of the priority of each MDR calculated by the expression", and other CIs are the "definite description" or the "description somewhat in the abstract way by the specification of a role".

In the example in FIG. 9, the processing policy for the CI classified into the server A and the processing policy for the CI classified into the CPU 1 are respectively the "reference FCMDB" and the "reference master MDR", and examples in which there is no higher priority MDR. The processing policy for the CI classified into the CPU 2 is "higher priority MDR1", and only the MDR1 (MDR 200-1) is determined as a higher priority MDR according to the definite description. In the priority calculating expression described in the processing policy for the CI classified into the CPU 3, the point of the MDR other than the MDR1 is "0" when it is not the master and "1" when it is the master; the point of the MDR1 and the MDR (configuration information holding unit 150) of the FCMDB 100 is "5" as a base when the IC is managed; and in the two MDRs, the point of the MDR as a master is defined to be made higher by "1". Therefore, when the processing policy for the CI classified into the CPU 3 is applied, and when the MDR1 or the MDR (configuration information holding unit 150) of the FCMDB 100 manages the CI, the MDR functioning as a master MDR is set as a higher priority MDR. When none of the MDRs is a master MDR, both of them are set as higher priority MDRs. When none of the MDRs manages the CI, another MDR as a master is set as a higher priority MDR.

As described above, the processing policy setting scheme is not limited to the example illustrated in FIG. 9. In addition to the example illustrated in FIG. 9, the following setting schemes are considered.
(1) Setting the processing policy to record only
(2) Setting the processing policy to property only
(3) Setting the processing policy to property and record
(4) Setting the processing policy to all of property, record, and CI In the present embodiment, when no processing policy is set for a data unit, a processing policy in a broader (higher order) data unit is applied to the processing policy of the data unit. For example, when no processing policy is set for a property, the processing policy of a record including the property as an element is used as the processing policy for the property. In this case, if no processing policy is set also for the record, the processing policy for the CI including the record is the processing policy of the property.

Operation

Described below is the updating process of the configuration information in the FCMDB system with the configuration above.

In the FCMDB system 20, there is a case in which certain configuration information is doubly registered in a plurality of MDRs 200. In addition, in a plurality of MDRs 200, there are some MDRs which cannot update data while maintaining the secure state. Therefore, the plurality of MDRs 200 in the FCMDB system 20 configure a distributed database, but the data update in the distributed database cannot be performed by general two-phase commit control.

The FCMDB system 20 according to the present embodiment enables the update of the configuration information by two-phase commit control specific to the present embodiment described above by setting the MDR 200 which cannot maintain the secure state as the reference MDR or the other MDR. In the present embodiment, the two-phase commit control is performed by the update processing unit 140 in the FCMDB 100. In the present embodiment, the MDR 200 which cannot maintain the secure state is set as a reference MDR or an other MDR. The setting is performed by the priority inputter 210. The priority inputter 210 inputs the priority information to the update processing unit 140. The priority information is input to the priority input unit 1401 of the update processing unit 140, and registered in the priority DB 1402 by the priority input unit 1401. The unit of the configuration information is classified into a CI, a record, and a property in the descending order of the particle size. The CI is configured by one or a plurality of records, and a record is configured by one or a plurality of properties. As described above, the priority information according to the present embodiment is configured by the "data ID" and the "processing policy".

Entire flow of update processing unit 140

Figure 10:
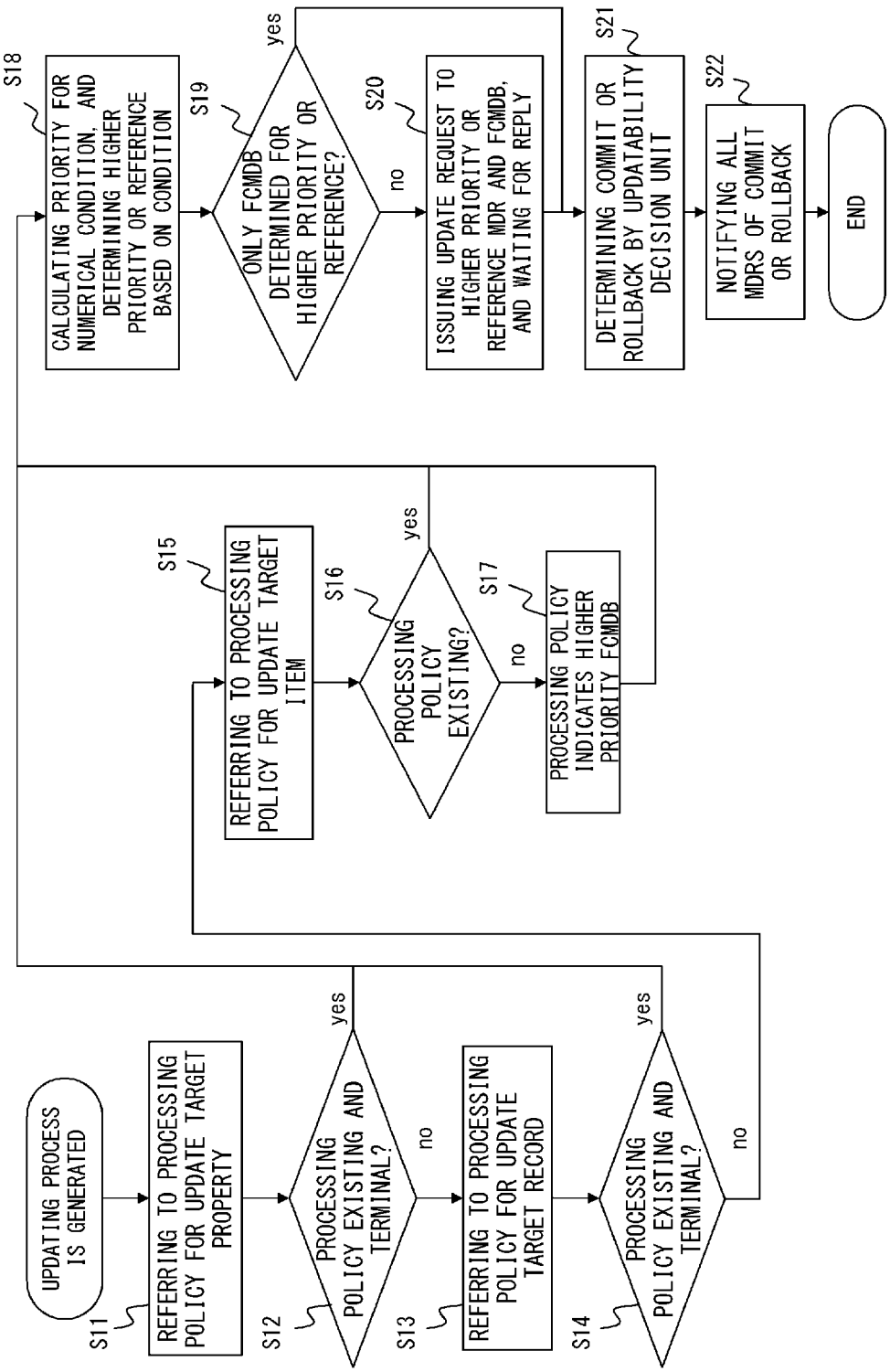
FIG. 10 is a flowchart of the entire process of the update processing unit in the FCMDB system.

FIG. 10 is a flowchart of the entire process of the update processing unit 140 of the FCMDB system 20. The update processing unit 140 performs the process of the flowchart in FIG. 10 each time the update input unit 1403 inputs the update request of the configuration information of the CI from each MDR 200-i (i=1 through n).

First, the priority decision unit 1404 refers to the processing policy for an update target property and registered in the priority DB 1402 (step S11). Then, the priority decision unit 1404 determines whether or not the processing policy of the property exists in the priority DB 1402 and the processing policy is a terminal (step S12). "processing policy is a terminal" indicates that "referring to the processing policy in a broader data unit" is not set as the processing policy. That is, "there is a processing policy and it is a terminal" does not indicate that the processing policy "refers to the processing policy in a broader data unit", but indicates a concrete specification of a higher priority/reference FCMDB or MDR such as "reference FCMDB", "higher priority MDR1", etc.

In display S12, the priority decision unit 1404 passes control to step S13 when there is no processing policy for a update target property or the processing policy is not a terminal (NO in step S12). On the other hand, the process is moved to step S18 if "there is a processing policy for a property and it is a terminal" (YES in step S12).

In step S13, the priority decision unit 1404 refers to the processing policy for a update target record (a record including the update target property) registered in the priority DB 1402. Then, the priority decision unit 1404 determines whether or not there is a processing policy for the record and the processing policy is a terminal (step S14). If the priority decision unit 1404 determines that there is no processing policy for the record, or the processing policy, if it exists, is not a terminal (NO in step S14), then the process is passed to step S15. If there is a processing policy for the record, and the processing policy for the record is a terminal (YES in step S14), then the process is passed to step S18.

In step S15, the priority decision unit 1404 refers to the processing policy for a update target item (item including the update target property (CI)) registered in the priority DB 1402. Then, the priority decision unit 1404 determines whether or not there is a processing policy for the update target item (step S16). If the priority decision unit 1404 determines that there is no processing policy for the update target item (NO in step S16), then the process is passed to step S17. If there is a processing policy for the update target item (YES in step S16), then the process is passed to step S18.

In step S17, the priority decision unit 1404 determines the "higher priority FCMDB" as the processing policy for the update target property. Then, the process is passed to step S18.

In step S18, if the priority decision unit 1404 determines that "there is a processing policy and the processing policy is a terminal" is obtained in step S12, S14, or S16, then the terminated processing policy is applied to determine a higher priority or reference MDR. In this case, if the processing policy directly describes the higher priority or reference MDR such as the "higher priority MDRi (i=1 through n)", the "reference FCMDB", etc., or if the processing policy is set as a "higher priority FCMDB" in step S17, then the processing policy is adopted to determine a higher priority or reference MDR. On the other hand, if the processing policy for property, record, or CI is described by a numerical condition (determination of a higher priority or reference MDR based on a priority calculating expression or its calculation result), then the priority is calculated, and a higher priority or reference MDR is determined by applying the calculation result and condition.

When the process in step S18 is terminated, the priority decision unit 1404 determines whether or not the higher priority or reference MDR is only the FCMDB (configuration information database of FCMDB) (step S19). If the priority decision unit 1404 determines that only the FCMDB is a higher priority or reference MDR (YES in step S19), the process is passed to step S21. If the priority decision unit 1404 determines that a higher priority or reference MDR is not only the FCMDB (NO in step S19), the process is passed to step S20.

In step S20, the update request communication unit 1405 transmits a update request to the higher priority or reference MDR and FCMDB, waits for a reply, and passes the process to step S21.

In step S21, the updatability decision unit 1406 receives a reply from the MDR or the FCMDB to which the update request communication unit 1405 has transmitted the update request, and determines commit or rollback for the update based on the reply. Then, the updatability decision unit 1406 notifies all MDRs relating to the update (including the configuration information holding unit of the FCMDB) of the determination result (commit or rollback) (step S22), thereby terminating the process of the flowchart.

Flow of the processes of the updatability decision unit 1406

Figure 11:
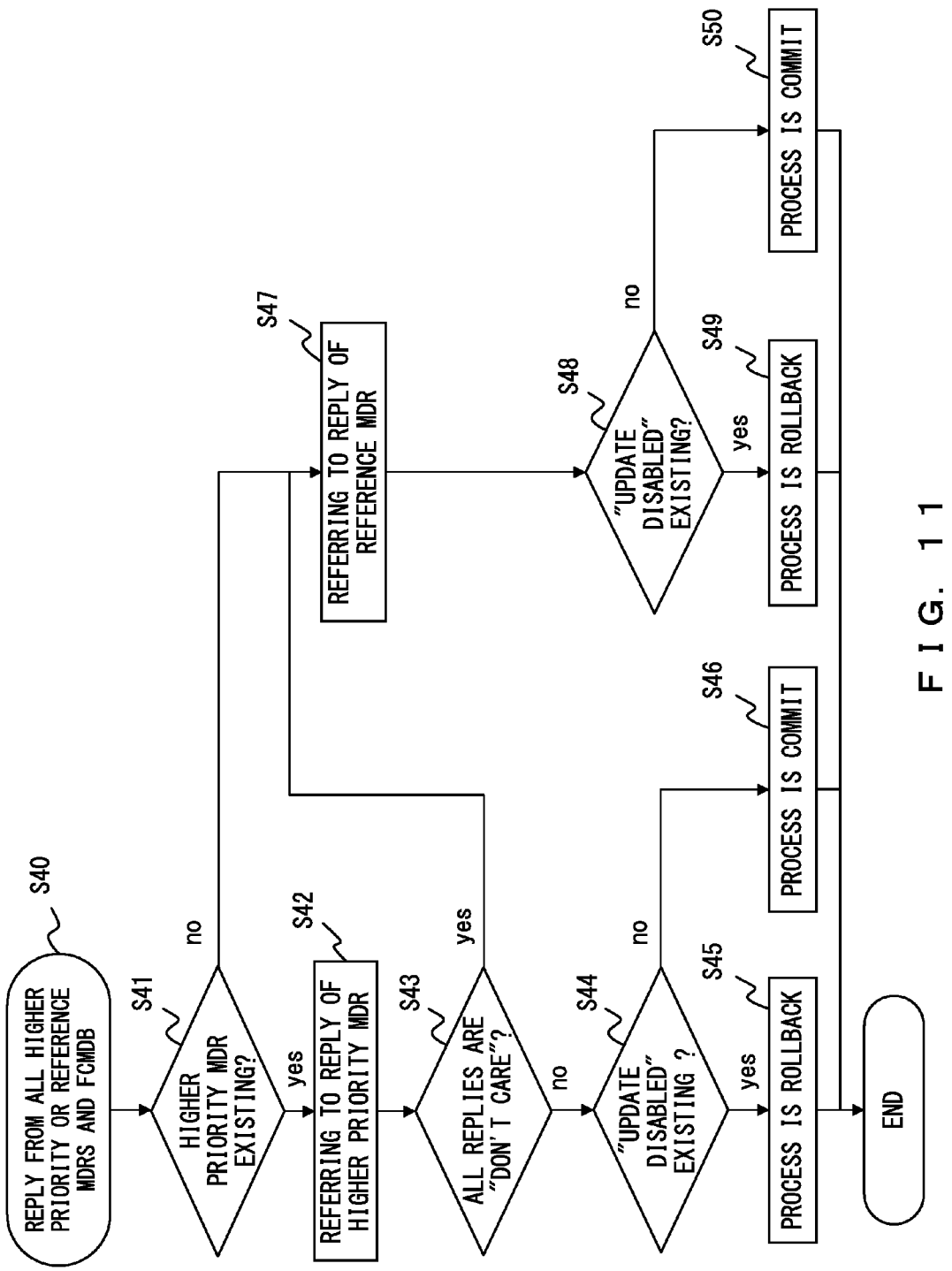
FIG. 11 is a flowchart of the process of the two-phase commit control by the updatability decision unit.
Figure 12:
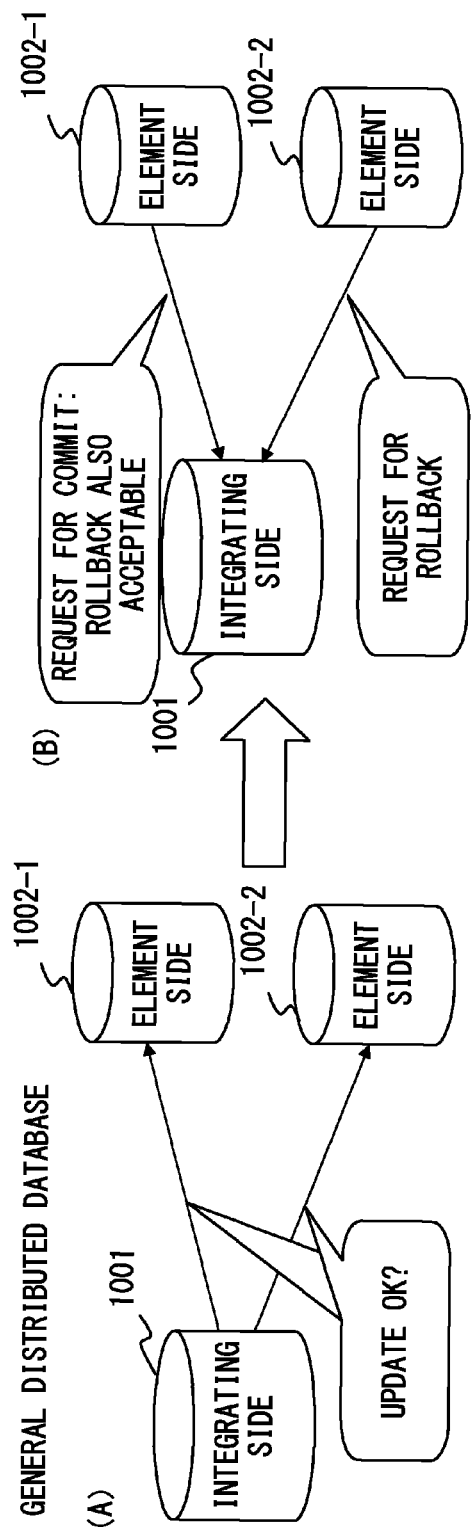
FIG. 12 is a schematic diagram of the method of the first phase of the two-phase commit in a general distributed database.

FIG. 11 is a flowchart of the process (details of the process in step S21 in FIG. 10) of the two-phase commit control by the updatability decision unit 1406.

The updatability decision unit 1406 receives a reply from all of the higher priority or reference MDRs to which the update request communication unit 1405 has transmitted the update request (step S40). The updatability decision unit 1406 determines whether or not there is a higher priority MDR in the MDRs which have returned the responses (step S41). If there is any (YES in step S41), the process is passed to step S42. If there is no such MDR, the process is passed to step S47.

In step S42, the updatability decision unit 1406 refers to the responses of all higher priority MDRs. Then, the updatability decision unit 1406 determines whether or not all responses are "Don't Care" (step S43). Unless all responses are "Don't Care" (NO in step S43), the process is passed to step S44. If all responses are "Don't Care" (YES in step S43), the process is passed to step S47.

In step S44, the updatability decision unit 1406 determines whether or not "update disabled" exists in the reply of the higher priority MDR. If there is "update disabled" (YES in step S44), the updatability decision unit 1406 notifies all MDRs 200 relating to the updating process and configuration information holding units 150 of the FCMDB 100 of the rollback of the updating process (step S45), thereby terminating the process of the flowchart. On the other hand, if it is determined in step S44 that "update disabled" does not exist in the reply of the higher priority MDR (NO in step S44), then the updatability decision unit 1406 notifies all MDRs 200 relating to the updating process and configuration information holding units 150 of the FCMDB 100 of the commit of the updating process (step S46), thereby terminating the process of the flowchart.

Thus, the updatability decision unit 1406 notifies all MDRs 200 relating to the updating process and configuration information holding units 150 of the FCMDB 100 of the rollback.

In step S47, the updatability decision unit 1406 refers to the reply of the reference MDR, and determines whether or not there is "update disabled" in the reply (step S48). If there is "update disabled" (YES in step S48), the updatability decision unit 1406 notifies all MDRs 200 relating to the updating process and configuration information holding units 150 of the FCMDB 100 of the rollback of the updating process (step S49), thereby terminating the process of the flowchart. On the other hand, if it is determined that "update disabled" does not exist (NO in step S48), the updatability decision unit 1406 notifies all MDRs 200 relating to the updating process and configuration information holding units 150 of the FCMDB 100 of the commit of the updating process (step S50), thereby terminating the process of the flowchart.

Thus, the updatability decision unit 1406 refers to the reply of the reference MDR when "there is no higher priority MDR in the participants in the updating process" or "all replies are "Don't Care" although there are higher priority MDRs in the participants in the updating process". If there is any "update disabled" in the replies of the reference MDRs, the updatability decision unit 1406 notifies all MDRs 200 relating to the updating process and configuration information holding units 150 of the FCMDB 100 of the rollback.

As described above, in the present embodiment, it is not necessary for an MDR set as a non-higher-priority MDR to transmit a response while maintaining the secure state in response to an update request from the FCMDB. Therefore, in the present embodiment, it is possible to establish the synchronization in data updating and to maintain the data consistency, although the configuration information database system includes an MDR which cannot return a response to a update request from an FCMDB while maintaining the secure state. In addition, according to the present embodiment, it is not necessary for any MDR to maintain the secure state when there is only one higher priority MDR with respect to certain data and when the certain data is updated. Also according to the present embodiment, when there is an MDR which probably takes a long time to return a reply after receipt of an update request, it is possible to shorten the time required to perform the entire updating process by returning "Don't Care" from the MDR at an earlier stage.

The present invention can be realized by implementing the variations within the scope of the gist of the present invention without limit to the above-mentioned embodiments.

Industrial Applicability

The present invention is preferably applied to the management for configuration of the information system in accordance with the ITIL.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. An integrated management database system having a plurality of element databases for holding configuration information about an information system to be managed and an integrated database for integrally managing the plurality of element databases, wherein the integrated database comprises:

a storage device including a non-transitory computer readable storage medium to store the integrated database;

a configuration information database to collectively manage the configuration information held in the plurality of element databases;

processing policy registration unit for registering in advance a processing policy for a two-phase commit protocol for each of the configuration information registered in the configuration information database;

update request unit for referring to the processing policy relating to update data registered in the processing policy registration unit when data stored in the configuration information database is updated, and transmitting an update request only to a higher priority element database holding the update data;

updatability decision unit for receiving a response from the element database to which the update request unit transmitted the update request, and determining whether or not an update is committed based on the received response; and update process communication unit for instructing all element databases holding the update data to perform commit or rollback depending on the determination result of the updatability decision unit, wherein the processing policy is information for classification of the element database and configuration information database of the integrated database into a priority element database, a reference element database, or an other element database, according to priority of the update data held by each of the element databases, the processing policy including a condition of determining a priority element database or a reference element database based on a mathematical expression for calculating a priority and on a calculated priority, wherein the mathematical expression includes as coefficients a point assigned to each of the element databases, a point assigned to the configuration information database of the integrated database, and a point assigned to a master element database holding the configuration information as a primary information source in the system, and wherein the update request unit determines each element database as a priority element database, a reference element database or an other element database, and notifies only the priority element database and the reference element database of the update request.

2. The integrated management database system according to claim 1, wherein
the processing policy is set such that the element database holding the configuration information as a primary information source in the system is a priority element database or a reference element database.

3. The integrated management database system according to claim 1, wherein
the processing policy is set such that a specific element database is a priority element database or a reference element database.

4. The integrated management database system according to claim 1, wherein
the processing policy is set such that the configuration information database of the integrated database is a priority element database or a reference element database.

5. The integrated management database system according to claim 1, wherein
there are three optional responses from the element databases including a request for commit, a request for rollback, and "Don't Care"; and
the updatability decision unit ignores the "Don't Care" response, and determines to commit or rollback a data updating process based on only the request for commit and the request for rollback from among the request for commit the request for rollback, and the "Don't Care".

6. The integrated management database system according to claim 5, wherein
the updatability decision unit determines to rollback the data updating process when there is any reply indicating "update disabled" in the replies from priority element databases.

7. The integrated management database system according to claim 5, wherein
the updatability decision unit may determine to commit the data updating process even when the replies from reference element databases includes a reply indicating "update disabled".

8. The integrated management database system according to claim 5, wherein
the updatability decision unit determines to commit or rollback the data updating process based on a response of a reference element database when the replies of all priority element databases are "Don't Care".

9. The integrated management database system according to claim 1, wherein
the updatability decision unit determines to commit or rollback the data updating process based on a response of a reference element database when no reply is received from a priority element database.

10. The integrated management database system according to claim 1, wherein
data of a configuration item as a management unit of the configuration information is, from a higher order data unit, a configuration item, a record, and a property, and the processing policy can be set separately for each data unit.

11. The integrated management database system according to claim 10, wherein
the update request unit sequentially refers to a processing policy from a lower order data unit, and a processing policy of a data unit whose processing policy is set is applied.

12. The integrated management database system according to claim 11, wherein
a processing policy set in a data unit specifies applying a processing policy set for a higher order data unit.

13. The integrated management database system according to claim 1, wherein
when it is necessary that data matches system data, a processing policy for the data is set such that an element database holding the data is a priority element database.

14. The integrated management database system according to claim 1, wherein
the reference element database does not need to maintain a secure state, and may update data, even when the reference element database receives rollback instruction is received from the update process communication unit in response to a reply of updatability.

15. An integrated management database system having a plurality of element databases for holding configuration information about an information system to be managed and an integrated database for integrally managing the plurality of element databases, wherein
the integrated database comprises:
a storage device including a non-transitory computer readable storage medium to store the integrated database;
a configuration information database to collectively manage the configuration information held in the plurality of element databases;
a configuration information holding unit to write the configuration information to the configuration information database;
a priority input unit to accept priority information including a processing policy about each configuration information managed in the configuration information database;
a priority database to hold priority information accepted by the priority input unit;

an update registration and input unit to accept update and registration of data from an element database;

a priority decision unit to refer to a processing policy for a two-phase commit protocol for update data held in the priority database, with respect to the update data accepted by the update registration and input unit, and to determine an element database for which a request to update the update data is to be issued;

an update request communication unit to notify an element database determined to request the update by the priority decision unit of an update request of the update data;

an updatability decision unit to receive a reply from an element database which has received an update request notification from the update request unit, and to determine commit or rollback of the updating process of the configuration information based on the reply; and an update process communication unit to notify the element database in the system and the configuration information database of commit or rollback of the configuration information based on a determination result of the updatability decision unit, wherein the processing policy is information for classification of the element database and configuration information database of the integrated database, into a priority element database, a reference element database, or an other element database, according to priority of the update data held by each of the element databases, the processing policy including a condition of determining a priority element database or a reference element database based on a mathematical expression for calculating a priority and on a calculated priority, wherein the mathematical expression includes as coefficients a point assigned to each of the element databases, a point assigned to the configuration information database of the integrated database, and a point assigned to a master element database holding the configuration information as a primary information source in the system, and wherein the update request communication unit determines each element database as a priority element database, a reference element database or an other element database, and notifies only the priority element database and the reference element database of the update request.

16. A method of update synchronization of an integrated management database system having a plurality of element databases for holding configuration information about an information system to be managed and an integrated database for integrally managing the plurality of element databases, the method comprising:

a processing policy registering step to register, using a computer including at least one processor, a processing policy for a two-phase commit protocol in advance with respect to each data of the configuration information registered in a configuration information database collectively managing configuration information held by the plurality of element databases;

an update requesting step to refer, using the computer, to a processing policy relating to update data stored in the configuration information database when the data is updated, and to transmit an update request only to a higher priority element database holding the update data;

an updatability decision step to receive, via the computer, a response from an element database to which an update request has been transmitted in the update requesting step, and to determine whether or not the update is committed based on the received response; and an update process communicating step to instruct, via the computer, all element databases holding the update data to perform commit or rollback depending on the determination result in the updatability decision step, wherein the processing policy is information for classification of the element database and configuration information database of the integrated database into a priority element database, a reference element database, or an other element database, according to priority of the update data held by each of the element databases, the processing policy including a condition of determining a priority element database or a reference element database based on a mathematical expression for calculating a priority and on a calculated priority, wherein the mathematical expression includes as coefficients a point assigned to each of the element databases, a point assigned to the configuration information database of the integrated database, and a point assigned to a master element database holding the configuration information as a primary information source in the system, and wherein the update requesting step determines each element database as a priority element database, a reference element database or an other element database, and notifies only the priority element database and the reference element database of the update request.

17. An integrated database device which integrally manages a plurality of element databases stored on a storage device for holding configuration information about an information system to be managed, comprising:

a configuration information database stored on a non-transitory computer readable storage medium to collectively manage the configuration information held in the plurality of element databases;

processing policy registration unit for registering in advance a processing policy for a two-phase commit protocol for each of the configuration information registered in the configuration information database;

update request unit for referring to the processing policy relating to update data registered in the processing policy registration unit when data stored in the configuration information database is updated, and transmitting an update request only to a higher priority element database holding the update data;

updatability decision unit for receiving a response from the element database to which the update request unit transmitted the update request, and determining whether or not an update is committed based on the received response; and update process communication unit for instructing all element databases holding the update data to perform commit or rollback depending on the determination result of the updatability decision unit, wherein the processing policy is information for classification of the element database and configuration information database of the integrated database into a priority element database, a reference element database, or an other element database, according to priority of the update data held by each of the element databases, the processing policy including a condition of determining a priority element database or a reference element database based on a mathematical expression for calculating a priority and on a calculated priority, wherein the mathematical expression includes as coefficients a point assigned to each of the element databases, a point assigned to the configuration information database of the integrated database, and a point assigned to a master element database holding the configuration information as a primary information source in the system, and wherein the update request unit determines each element database as a priority element database, a reference element database or an other element database, and notifies only the priority element database and the reference element database of the update request.

* * * * *